Jan. 9, 1923.

A. E. OSBORN.
REVERSE GEARING.
FILED AUG. 25, 1920.

Inventor
Alden E. Osborn.

Jan. 9, 1923.

A. E. OSBORN.
REVERSE GEARING.
FILED AUG. 25, 1920.

Inventor
Alden E. Osborn

Patented Jan. 9, 1923.

1,441,520

UNITED STATES PATENT OFFICE.

ALDEN E. OSBORN, OF NEW YORK, N. Y.

REVERSE GEARING.

Application filed August 25, 1920. Serial No. 405,935.

*To all whom it may concern:*

Be it known that I, ALDEN E. OSBORN, a citizen of the United States of America, and a resident of New York, county of Bronx, and State of New York, have invented certain new and useful Improvements in Reverse Gearing, of which the following is a specification.

This invention relates to reversing mechanism of a type in which the gears are normally out of engagement but are slid sideways into engagement at the time when it is desired that the driven shaft be turned in the reverse direction to the driving shaft and it provides especially for the automatic engagement of a suitable friction clutch between the prime mover and the driving shaft in proper relation to the movement of the gears, and to the engagement of a positive jaw-clutch adapted to lock the driving and driven shafts together. The parts are so interconnected that they are brought, in proper sequence, into the different relative positions that will give the various desired movements of the driven shaft, in relation to the driving shaft, by the motion of a single collar thru actuating lever. While this gear is particularly suited for use in motor boats it can be adapted for other purposes where it is desired to connect a driven element to a driving element so that it will be driven in the same or in the opposite direction.

In the accompanying drawings I have, for the purposes of disclosure, illustrated the invention embodied in two different forms and would have it understood that it is susceptible of embodiment in still other forms without departure from the true spirit and scope of the invention as defined in the appended claims. In these drawings:—

Similar numerals of reference indicate similar parts throughout the several views.

Figure 1:
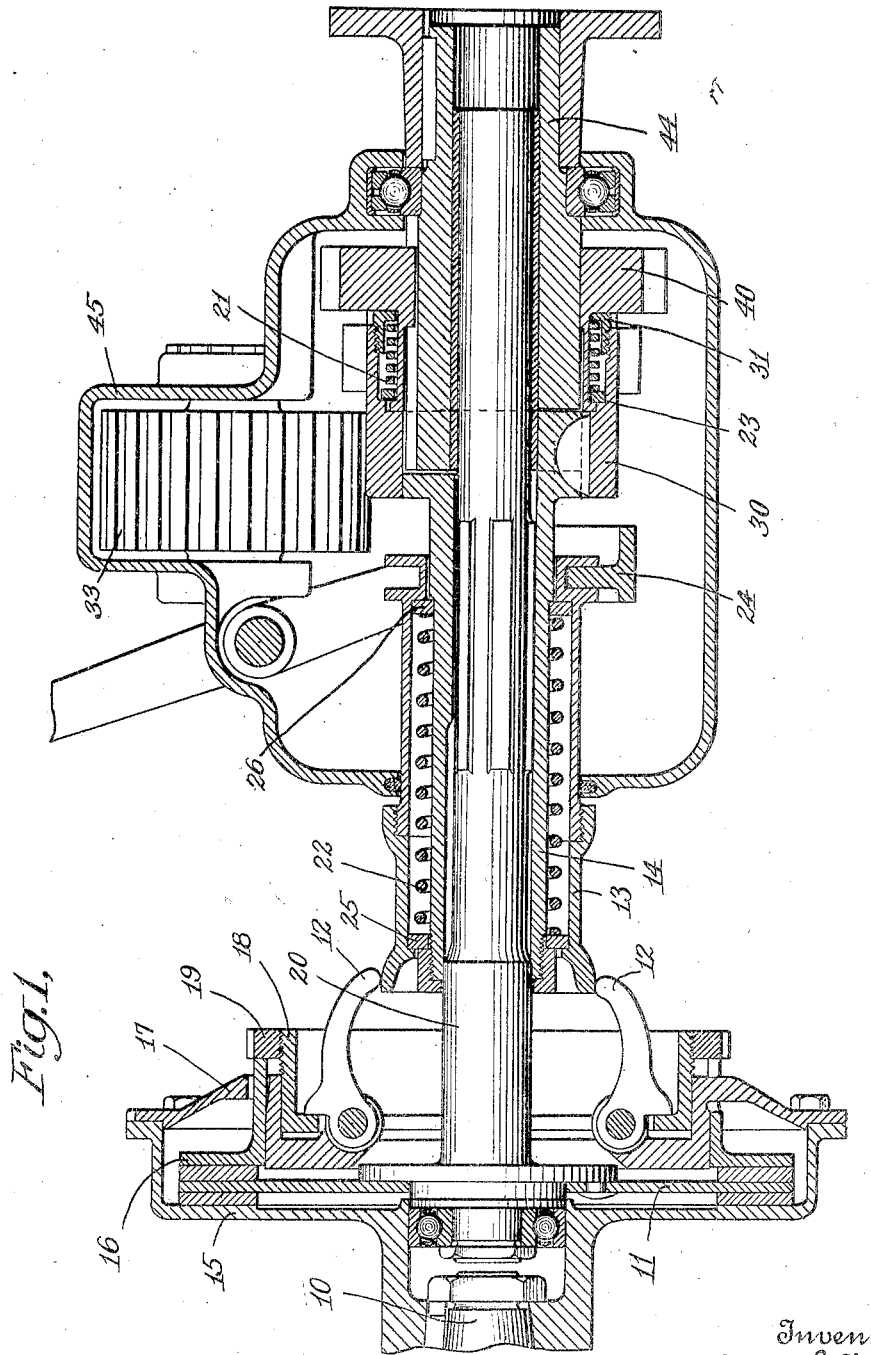
Figure 1 represents a longitudinal sectional view of one form of my invention.
Figure 2:
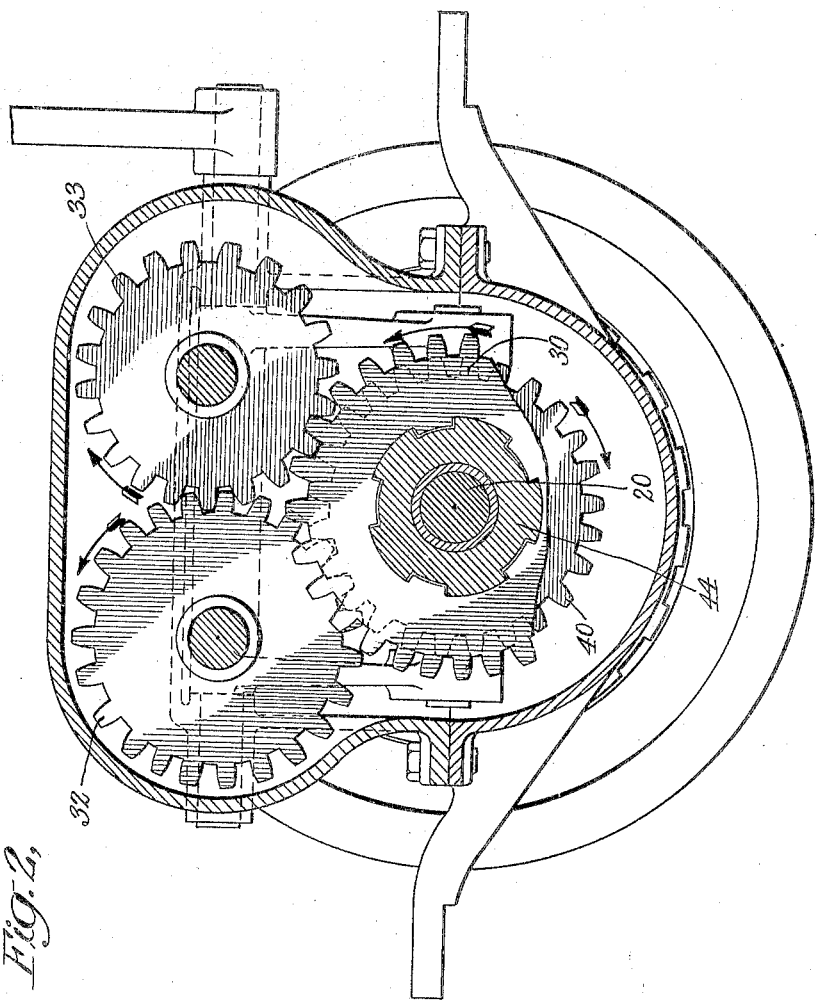
Figure 2 represents a cross sectional view of the mechanism illustrated in Figure 1 taken on a line of the gear system.

Referring to Figure 1 10 indicates the shaft of the engine or other driving device which shaft carries the fly wheel or clutch casing 15. This casing 15 contains a friction clutch adapted to connect or disconnect, as required, the main driving shaft or element 20 of the reverse gear mechanism with the primary driving shaft 10 just referred to. The friction clutch is shown as comprising a single driven disc 11 fastened to the driving shaft 20 and a co-operating friction face on the casing 15 and on a movable disc 16 which disc is slidably carried by plate 17 attached to the casing 15 and is brought into contact with the disc 11 by the expansion of the clutch dogs 12 which are pivoted on the plate 17 and act on the disc thru the medium of the collar 18 and clutch adjusting nut 19 threaded thereon. In order to expand the clutch dogs 12, when it is desired to engage the clutch, a spool 13 is provided which is made with a large diameter shoulder at each end so that when it is moved to either extreme of its movement the clutch would be engaged. It should be clearly understood that the friction clutch mechanism just described can be modified in many ways and particularly that a number of friction discs may be used on both the clutch casing 15 and driving shaft 20 should such a multiple disc arrangement be desired. The arrangement of the spool 13, especially, may be modified as any equivalent device that will insure the engagement of the clutch at each end of its travel can be used. This spool 13 or equivalent device is loosely mounted on the forward drive jaw-clutch sleeve 14 and is held in position longitudinally by a suitable spring 22. The sleeve is a sliding fit on the reverse gear shaft 20 (being broached to fit keys on the shaft) and carries, rigidly fixed on its outside around the jaw-clutch, the driving gear 30 of the reverse gear system. The jaw-clutch on this sleeve 14 is designed to mesh with the jaw-clutch on the driven element of the gear, the sleeve 44, which is attached to the propeller shaft or other device it is desired to drive, and rotates in a bearing in the stationary gear enclosing casing 45. The end of the reverse gear or driving shaft 20 is supported by a bearing in the interior of this sleeve 44 while the exterior of the sleeve is provided with keys fitting in keyways in the hub of the driven gear of the reverse gear system so that this gear, while free to slide, must turn with the sleeve. As this gear 40 slides simultaneously with the gear 30, jaw-clutch sleeve 14 and friction clutch spool 13, it is coupled to the gear 30 by a ring 31 screwed into this gear 30 and fitting in a groove in the hub of the gear 40. To put this ring in place it is, after being finished, sawed thru one side and sprung into the groove like a piston ring. In order to slide the gears a suitable collar 24 is arranged to engage a groove in the spool 13 and is actuated by any desired arrangement of levers or other parts as the means for shifting the spool is not a part of my invention. When the parts are in a position to give the reverse motion to the sleeve 44 the gear 30 is meshed with an intermediate gear 32 (shown in Figure 2) mounted on suitable bearings on the casing 45 which gear 32 in turn meshes with a second wider intermediate gear 33, also mounted on suitable bearings in the casing 45, that transmits the power back to the driven gear 40. The direction of rotation of these gears when the reverse is in action is shown by the arrows in Figure 2.

The operation of this form of my invention is as follows: The parts in Figure 1 are shown in the position they assume when the direct forward drive is in action. At this time both the friction clutch and the jaw-clutch are engaged and the gears 30 and 40 are completely out of mesh with their co-acting intermediate gears on the casing 45, thus driving the propeller shaft, or other desired part, directly from the engine without any idle parts in motion. To obtain neutral the jaw-clutch sleeve and attached parts, are moved forward so that the friction clutch is released, by the clutch dogs 12 coming off the large diameter end of the spool 13, without, however, bringing the jaw-clutch teeth on the sleeves 14 and 44 out of mesh so that the forward drive can be again put in without re-engaging these teeth. To obtain the reverse the control lever is moved so as to throw the sleeve 14, and accompanying parts, all the way forward with the result that—1st, the jaw-clutch is disengaged. 2nd, the driven gear 40 is engaged with its co-acting gear 33 on the casing 45 (thus connecting the intermediate gears to the driven sleeve 44 and bringing them to the same speed.) 3rd, the driving gear 30 is next meshed with its co-acting gear 32 on the casing thus bringing this gear 30, the jaw-clutch sleeve 14, the driving shaft 20 and the clutch disc 11 into driving connection with the driven sleeve 44; and 4th, the second clutch engaging end of the spool 13 comes into the clutch dogs 12 thus engaging the friction surfaces with the disc 11 and driving the parts from the engine when they are thus all in a position to turn the sleeve 44 and parts connected thereto backward. It will thus be noticed that the engagement of the gears when going into reverse occurs in such a way that they will not be injured even when it is done under the most unfavorable conditions while, when going from reverse to forward motion, the gears are simply slid out of mesh and the jaw-clutch engaged which, of course, occurs with the parts disconnected from the engine by the friction clutch being released. The spring 21 on the hub of the gear 40 and spring 22 in the clutch spool 13 are provided in order to permit meshing of the jaw-clutch or gears should the driven sleeve 44 of the mechanism be stationary. Thus if it is desired to obtain the forward drive and the teeth of the jaw-clutch should happen to come into contact on their ends in such a way that they cannot be meshed the effect of pressure on the shifting collar 24 is to compress the spring 22 and allow the clutch spool to expand the clutch dogs 12 thus slightly engaging the friction clutch and turning the jaw-clutch sleeve 14 so that the jaw-clutch teeth can go into proper engagement. Again, when going into reverse, should the ends of the teeth on the gears 33 and 40 happen to come together the spring 21 would be compressed to a sufficient extent to allow the teeth on the gears 30 and 32 to mesh or come together at their ends, according to the relative position of these gears, when the spring 22 would be compressed to allow the spool 13 to act on the clutch dogs 12 to engage the friction clutch to turn the gears sufficiently to allow them to mesh properly. It will be observed that the spring 21 for the gear 40 need only act in one direction and is therefore fitted with one loose washer 23 while the spring 22 for the clutch spool 13 acts in both directions and is therefore provided with a thrust washer 25 and 26 at each end. These springs also permit the movement of the clutch spool 13 so that the friction clutch can be released when the jaw clutch or gears are engaged and so much power is being transmitted that the driving pressure on the parts is so great as to prevent their longitudinal movement.

Figure 3:
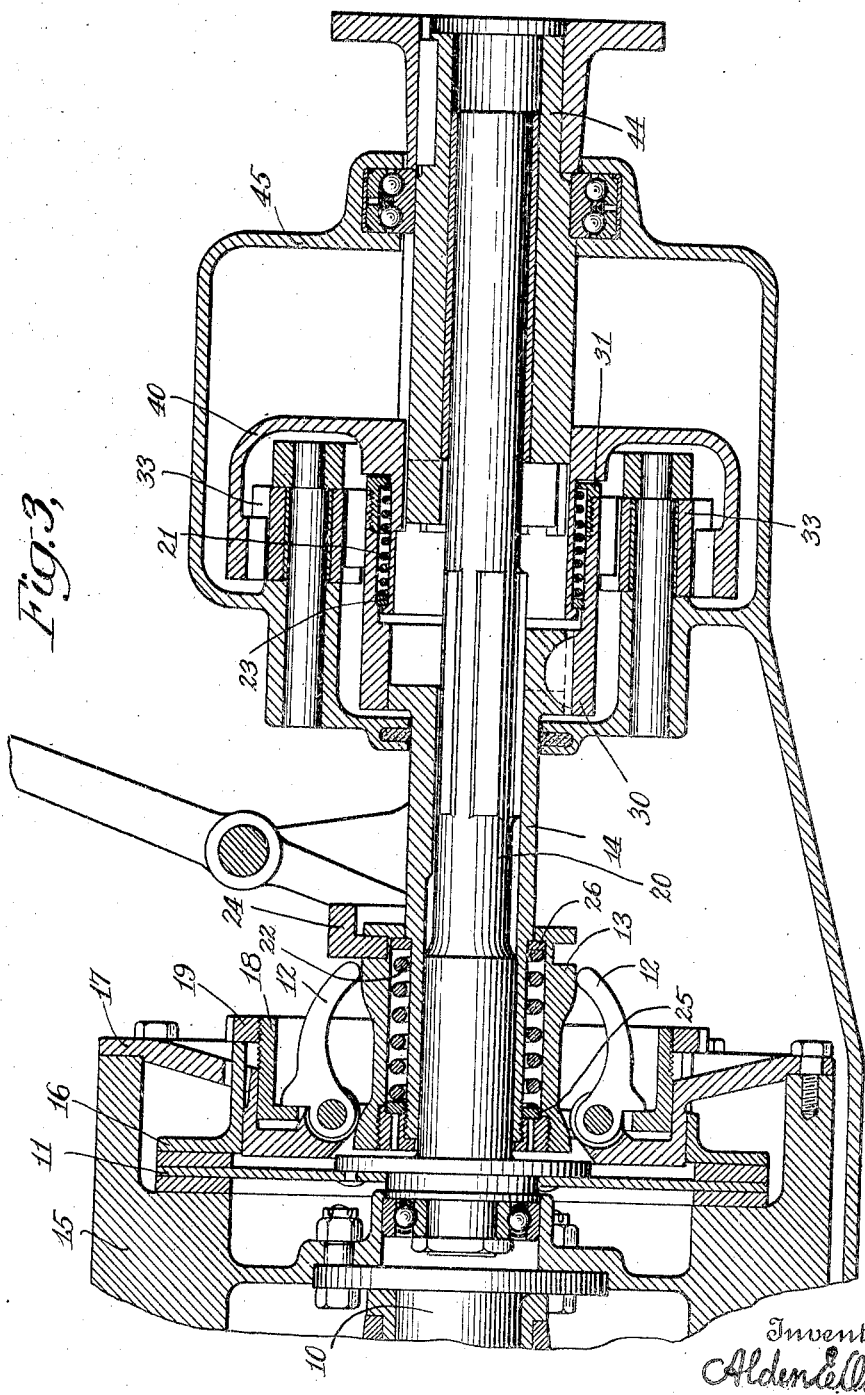
Figure 3 represents a longitudinal sectional view of a modification of the mechanism shown in Figure 1.

In the modification shown in Figure 3 all the parts are practically the same as in the form of my invention just described except the gearing used for the reverse and the arrangement of the shifting collar 24 which is outside the casing 45 and adjacent to the clutch dogs. The gearing differs in that the driven gear 40 is of the internal type and is arranged to mesh with a series of intermediate pinions 32 rotatably mounted on the casing 45 and adapted to mesh directly with the driving gear 30. Thus when the gears are in mesh the rotation of the driving gear obviously causes the driven internal gear and parts connected thereto to rotate in the reverse direction as with the previously described gear system. It is obvious that one or several intermediate pinions can be used without affecting the way in which the power is transmitted. The operation of this form of my invention is exactly the same as that previously described and can be readily understood.

Having thus described my invention, I claim as new and desire to secure by Letters Patent:—

1. In a transmission gearing the combination of a primary driving member, a driving element, and a driven element, a friction clutch adapted to connect or disconnect said primary driving member and said driving element, a longitudinally slidable member having two spaced clutch engaging cams, controllable means for moving said slidable member, a sleeve within said slidable member and longitudinally slidable on the driving element, and a spring between said slidable member and said sleeve whereby said sleeve is moved normally with said slidable member without its being compressed and whereby, should said sleeve be detained from free movement, it is compressed by the movement of the slidable member so that one of said clutch operating cams can engage said friction clutch and revolve said driving element and sleeve with said primary driving member.

2. In a transmission gearing the combination of a primary driving member, a driving element, and a driven element, a friction clutch adapted to connect or disconnect said primary driving member and said driving element, a longitudinally slidable member having spaced clutch engaging cams, controllable means acting thereon for moving said slidable member, a sleeve within said slidable member and longitudinally slidable on the driving element, and a spring between said slidable member and said sleeve to normally move said sleeve with said slidable member, without said spring being compressed, and to, should said sleeve be detained from free longitudinal movement, allow, by its compression, the slidable member to move independently of the sleeve and bring one of the clutch operating cams on said member to a position to engage said friction clutch and revolve said driving element and sleeve with said primary driving member.

3. In a transmission gearing the combination of a primary driving member, a driving element, and a driven element, a friction clutch adapted to connect or disconnect said primary driving member and said driving element, a longitudinally slidable member having a clutch engaging cam, controllable means acting thereon for moving said member, a sleeve within said slidable member and longitudinally slidable on the driving element, postive clutch teeth on said sleeve, positive clutch teeth on the driven element, adapted to mesh with the teeth on the sleeve, and a spring between said slidable member and said sleeve to normally move said sleeve with said slidable member, without said spring being compressed, when said positive clutch teeth on said sleeve and driven member are brought into mesh, and to, should said sleeve be detained from free longitudinal movement by the ends of said positive clutch teeth abutting, allow, by its compression, the slidable member to move independently of the sleeve and bring the clutch operating cam on said member to a position to engage said friction clutch and revolve said driving element and said sleeve with said primary driving member.

4. In a transmission gearing the combination of a primary driving member, a driving element, and a driven element, a friction clutch adapted to connect or disconnect said primary diving member and said driving element, a longitudinally slidable member having a clutch engaging cam, controllable means acting thereon for moving said member, a sleeve within said slidable member and longitudinally slidable on the driving element, a gear connected with said sleeve, and shiftable therewith, a gear connected with the driven element, and a spring between said slidable member and said sleeve to normally move said sleeve with said slidable member, without said spring being compressed, when said gear teeth are brought into mesh and to, should said sleeve be detained from free longitudinal movement by the ends of said gear teeth abutting, allow, by its compression, the slidable member to move independently of the sleeve and bring the clutch operating cam on said member to a position to engage said friction clutch and revolve said driving element, said sleeve and said gear connected thereto with said primary driving member.

5. In a transmission gearing the combination of a primary driving member, a driving element, and a driven element, friction clutch adapted to connect or disconnect said primary driving member and said driving element, a longitudinally slidable member having clutch engaging cams, controllable means acting thereon for moving said member, a sleeve longitudinally slidable on the driving element, positive clutch teeth on said sleeve, positive clutch teeth on said driven element adapted to mesh with the teeth on the sleeve, a gear connected with the sleeve and shiftable therewith, a gear connected with the driven element, a stationary frame, gears rotatably mounted on said frame, and a sping between said slidable member and said sleeve to normally move said sleeve with said slidable member, without said spring being compressed, when either said positive clutch teeth on the sleeve and driven element or said gear teeth connected to the sleeve and driven element are brought into mesh with said gears on the stationary frame, and to, should said sleeve be detained from free longitudinal movement by either the ends of said positive clutch teeth abutting or by the ends of the teeth of said gears abutting, allow, by its compression, the slidable member to move independently of the sleeve and bring that clutch operating cam controlling the friction clutch for the teeth which are abutting into a position to engage said clutch and revolve said driving element, said sleeve and said gear connected thereto with said primary driving member.

6. In a transmission gearing the combination of a primary driving member, a driving element, and a driven element, a friction clutch adapted to connect or disconnect said primary driving member and driving element, a sleeve longitudinally slidable on the driving element, controllable means for moving said sleeve, a gear longitudinally slidable on the driven element, a stationary frame, a gear rotatably mounted on said frame, means for transmitting the motion of the driving element to said stationary frame gear, and a spring between said sleeve and said gear on the driven element to normally move said gear with said sleeve, without said spring being compressed, when the teeth on said gear mesh with the teeth of the gear on the stationary fame, and to, should said gear on the driven element be detained from free longitudinal movement by the ends of said gear teeth abutting, allow, by its compression, the sleeve to move independently of the said driven element gear and means whereby said independent movement of said sleeve engages said friction clutch and revolves said driving element, said sleeve and said gear on the stationary frame by the rotation of said primary driving member.

7. In a transmission gearing the combination of a primary driving member, a driving element, and a driven element, a friction clutch adapted to connect or disconnect said primary driving member and said driving element, a sleeve longitudinally slidable on the driving element, controllable means for moving said sleeve, a gear longitudinally slidable on the driven element, a stationary frame, a gear rotatably mounted on said frame, means for transmitting motion of the driving element to said stationary frame gear, means for rotatably attaching said sleeve on the driving element to said gear on the driven element whereby to move said gear along said driven element by the longitudinal movemnt of said sleeve and bring said gear into or out of mesh with the gear on the stationary frame and means whereby, when said sleeve is moved to bring said gears into mesh, the said friction clutch is engaged to connect the primary driving member and the driving element.

8. In a transmission gearing the combination of a primary driving member, a driving element, and a driven element, a friction clutch adapted to connect or disconnect said primary driving member and said driving element, a sleeve longitudinally slidable on the driving element, positive clutch teeth on said sleeve, positive clutch teeth on said driven element adapted to mesh with the teeth on the sleeve, a gear connected with the sleeve and shiftable therewith, a gear longitudinally slidable on the driven element, a stationary frame, a gear rotatably mounted on said frame, means for rotatably attaching said sleeve on the driving element to said gear on the driven element whereby to move said gear along said driven element by the longitudinal movement of said sleeve, controllable means for moving said sleeve to engage its positive clutch teeth with the positive clutch teeth on said driven element or to engage the gear on the driving element with the gear on the stationary frame and also bring its connected gear into driving connection with said gear on the stationary frame and means whereby when said sleeve is so moved to bring said positive clutch teeth into mesh or when said sleeve is moved to bring said gears into mesh, the said friction clutch is engaged to connect the primary driving member and the driving element.

9. In a transmission gearing the combination of a driving element, a driven element, a gear longitudinally slidable on the driving element, a gear longitudinally slidable on the driven element, a stationary frame, a gear rotatably mounted on said frame, means for transmitting the motion of said driving element to said stationary frame gear, and means, between the two gears, for rotatably attaching said gear on the driving element to said gear on the driven element whereby to move said gear on the driven element longitudinally by the longitudinal movement of the said driving element gear and bring said driven element gear into or out of mesh with the gear on the stationary frame.

10. In a transmission gearing the combination of a driving element, a driven element, a gear longitudinally slidable on the driving element, a gear longitudinally slidable on the driven element, and means, within the said gear on the driving element, for rotatably attaching said gear to said gear on the driven element whereby the longitudinal movement of one of said gears is transmitted to the other said gear.

11. In a transmission gearing the combination of a driving element, a driven element, a gear longitudinally slidable on the said driving element, a gear longitudinally slidable on the driven element, and means for rotatably attaching said gear on the driving element to said gear on the driven element, whereby the longitudinal movement of one of said gears is transmitted to the other gear, comprising a groove on the hub of one of said gears and a ring engaging said groove and attached to the other of said gears.

12. In a transmission gearing the combination of a primary driving member, a driving element, and a driven element, a friction clutch adapted to connect or disconnect said primary driving member and said driving element, a longitudinally slidable sleeve on one of said elements, positive clutch teeth on said sleeve, positive clutch teeth on the other said element and adapted to mesh with the clutch teeth on the sleeve, controllable means for engaging or disengaging said friction clutch, and a connecting means, to longitudinally slide said sleeve, between said friction clutch controlling means and said sleeve, containing an elastic element whereby said sleeve is normally moved, without said elastic element coming into action by said friction clutch controlling means, and said positive clutch teeth are engaged, and whereby, should said sleeve be detained from free longitudinal movement by the ends of said positive clutch teeth abutting, said friction clutch controlling means can move, thru the action of said elastic element, and operate to engage said friction clutch to cause said driving element to rotate with said driving member.

13. In a transmission gearing the combination of a primary driving member, a driving element, and a driven element, a friction clutch adapted to connect or disconnect said primary driving member and said driving element, a longitudinally slidable sleeve on one of said elements, positive clutch teeth on said sleeve, positive clutch teeth on the other said element from that carrying the sleeve and adapted to mesh with the clutch teeth on the sleeve, controllable means for engaging or disengaging said friction clutch, and a connecting means, to longitudinally slide said sleeve, between said friction clutch controlling means and said sleeve, containing an elastic element whereby said sleeve is normally moved, without said elastic element coming into action, by said friction clutch controlling means, and whereby, should said sleeve be detained from free longitudinal movement by the driving pressure thereon, said friction-clutch controlling means can move, thru the action of said elastic element, and operate to disengage said friction clutch and allow said driving member to rotate independently of said driving element.

14. In a transmission gearing the combination of a primary driving member, a driving element, and a driven element, a friction clutch adapted to connect or disconnect said primary driving member and said driving element, a longitudinally slidable gear on one of said elements, a stationary frame, a gear rotatably mounted on said frame and connected with the other of said elements and adapted to mesh with the longitudinally slidable gear, controllable means for engaging or disengaging said friction clutch, and a connecting means, to longitudinally slide said slidable gear, between said friction clutch controlling means and said gear, containing an elastic element whereby said gear is normally moved, without said elastic element coming into action, by the said friction clutch controlling means and the gear teeth of the slidable gear and stationary frame gear engaged, and whereby should said slidable gear be detained from free longitudinal movement by the ends of said gear teeth abutting, said friction clutch controlling means can move, thru the action of said elastic element, and operate to engage said friction clutch to cause said driving element to rotate with said driving member.

15. In a transmission gearing the combination of a primary driving member, a driving element, and a driven element, a friction clutch adapted to connect or disconnect said primary driving member and said driving element, a longitudinally slidable gear on one of said elements, a stationary frame, a gear rotatably mounted on said stationary frame and adapted to mesh with the longitudinally slidable gear, means for transmitting motion between said stationary frame gear and the other of the said elements from that having this longitudinally slidable gear, controllable means for engaging or disengaging said friction clutch, and a connecting means, to longitudinally slide said slidable gear, between said friction clutch controlling means and said gear, containing an elastic element whereby said gear is normally moved, without said elastic element coming into action, by said friction clutch controlling means, and whereby, should said slidable gear be detained from free longitudinal movement by the driving pressure thereon, said friction clutch controlling means can move, thru the action of said elastic element, and operate to disengage said friction clutch and allow said driving member to rotate independently of said driving element.

In witness whereof, I have hereto set my hand this 23rd day of August, 1920.

ALDEN E. OSBORN.